(12) United States Patent
Hsu et al.

(10) Patent No.: US 8,537,312 B2
(45) Date of Patent: Sep. 17, 2013

(54) TRIPLE-GATE LIQUID CRYSTAL DISPLAY PANEL

(75) Inventors: Chih-Hsiang Hsu, Taoyuan (TW); Guang-Yi Zeng, Tainan (TW)

(73) Assignee: Chunghwa Picture Tubes, Ltd., Taoyuan (TW)

(*) Notice: Subject to any disclaimer, the term of this patent is extended or adjusted under 35 U.S.C. 154(b) by 177 days.

(21) Appl. No.: 13/183,885

(22) Filed: Jul. 15, 2011

(65) Prior Publication Data
US 2012/0120359 A1    May 17, 2012

(30) Foreign Application Priority Data

Nov. 17, 2010    (TW) .............................. 99222263 U

(51) Int. Cl.
*G02F 1/1335*    (2006.01)
(52) U.S. Cl.
USPC ........................................................ 349/106
(58) Field of Classification Search
USPC .................. 349/106, 43, 139, 108, 46, 142
See application file for complete search history.

(56) References Cited

U.S. PATENT DOCUMENTS 6,870,584 B2 *    3/2005    Kawase et al. ................ 349/106

FOREIGN PATENT DOCUMENTS

TW            200912834           3/2009

* cited by examiner

*Primary Examiner* — Thoi Duong
(74) *Attorney, Agent, or Firm* — Muncy, Geissler, Olds & Lowe, PLLC

(57) ABSTRACT

A triple-gate liquid crystal display (LCD) panel includes a plurality of first monochromatic pixels, a plurality of second monochromatic pixels, and a plurality of third monochromatic pixels. The first monochromatic pixels, the second monochromatic pixels, and the third monochromatic pixels are arranged in columns and rows. The first monochromatic pixels, the second monochromatic pixels, and the third monochromatic pixels in each row are repeatedly arranged in a horizontal sequence. The horizontal sequence from left to right is the first monochromatic pixel, the second monochromatic pixel, and the third monochromatic pixel. The first monochromatic pixels in each column are not adjacent to each other, the second monochromatic pixels in each column are not adjacent to each other, and the third monochromatic pixels in each column are not adjacent to each other.

5 Claims, 3 Drawing Sheets

TRIPLE-GATE LIQUID CRYSTAL DISPLAY PANEL

CROSS-REFERENCE TO RELATED APPLICATION

This application claims the benefit of Taiwan Patent Application No. 099222263, filed on Nov. 17, 2010, which is hereby incorporated by reference for all purposes as if fully set forth herein.

BACKGROUND OF THE INVENTION

1. Field of Invention

The present invention relates to a liquid crystal display (LCD) panel, and more particularly to a triple-gate LCD panel.

2. Related Art

In a current LCD technology, a triple-gate LCD panel has been developed. The triple-gate LCD panel has a plurality of main pixel units arranged in columns and rows, and one main pixel unit is driven by three adjacent scan lines. Each main pixel unit is consist of three sub-pixel units with different colors and arranged in a column.

The sub-pixel units in one main pixel unit are respectively a red pixel unit, a green pixel unit, and a blue pixel unit, and each sub-pixel unit (that is, the red pixel unit, the green pixel unit, or the blue pixel unit) is electrically connected to a scan line. In addition, the colors of the sub-pixel units in any row are the same. For example, all of the sub-pixel units arranged in one row are red pixel units, green pixel units, or blue pixel units.

Since each main pixel unit is driven by three adjacent scan lines in the triple-gate LCD panel, the triple-gate LCD panel has too many scan lines compared with a conventional LCD, so that the time that each scan line charges the sub-pixel units has to be reduced so as to causes inadequate charging in the sub-pixel units.

In order to avoid the situation that the sub-pixel units are charged inadequately, during the operation of the current triple-gate LCD panel, not only the sub-pixel units in one row are charged, but also the sub-pixel units in a next row which is ready to be turned on are pre-charged when the sub-pixel units in this row are being charged, so as to avoid charging the sub-pixel units inadequately.

In addition, since the current triple-gate LCD panel is usually driven in a manner of dot inversion, each data line is electrically connected to two adjacent columns of sub-pixel units, and in the two adjacent sub-pixel units within one column, one of the sub-pixel units is connected to one of the data lines, and the other sub-pixel unit is connected to another data line. Therefore, the sub-pixel units arranged in each column are alternately connected to two data lines.

Generally, after a triple-gate LCD panel is completed, a series of electrical test procedures are performed to separate normal LCD panels from abnormal panels. When some electrical tests are performed, the triple-gate LCD panel will display an Ichimatsu pattern, so that a testing machine can check whether the triple-gate LCD panel works normally through the Ichimatsu pattern.

In particular, when the triple-gate LCD panel displays the Ichimatsu pattern, half of the pixel units display a color in low gray scale level, such as black, and the rest of the pixel units display a color in mid gray scale level. The main pixel units displaying the color in mid gray scale level and the main pixel units displaying the color in low gray scale level are alternately distributed as the pattern of a chess board. Therefore, two adjacent main pixel units in any one of the columns or in any one of the rows respectively display the color in mid gray scale level and the color in low gray scale level.

However, the current triple-gate LCD panel is driven in a manner of pre-charge and dot inversion, and the colors of the sub-pixel units in any one of the rows are the same. Therefore, when the Ichimatsu pattern is displayed, in all the sub-pixel units displaying the color in mid gray scale level, the voltage received by the sub-pixel units with a certain color (usually red) and pre-charged is not identical with the voltage received by the sub-pixel units with the other two colors and pre-charged. It causes that the color of the Ichimatsu pattern tends to a certain color (such as red), thereby affecting the quality of the picture.

SUMMARY OF THE INVENTION

The present invention is directed to a triple-gate LCD panel which is capable of addressing the problem that colors of an Ichimatsu pattern is close to a certain color.

The present invention provides a triple-gate LCD panel comprising a plurality of first monochromatic pixels, a plurality of second monochromatic pixels, and a plurality of third monochromatic pixels. The first monochromatic pixels, the second monochromatic pixels, and the third monochromatic pixels are arranged in columns and rows. The first monochromatic pixels, the second monochromatic pixels, and the third monochromatic pixels in each row are repeatedly arranged in a horizontal sequence. The horizontal sequence from left to right is the first monochromatic pixel, the second monochromatic pixel, and the third monochromatic pixel. The first monochromatic pixels in each column are not adjacent to each other, the second monochromatic pixels in each column are not adjacent to each other, and the third monochromatic pixels in each column are not adjacent to each other.

The first monochromatic pixels, the second monochromatic pixels, and the third monochromatic pixels in each row are repeatedly arranged in the horizontal sequence, and the first monochromatic pixels in each column are not adjacent to each other, the second monochromatic pixels in each column are not adjacent to each other, and the third monochromatic pixels in each column are not adjacent to each other. Therefore, when an Ichimatsu pattern is displayed, the voltages received by the first monochromatic pixels, the second monochromatic pixels, and the third monochromatic pixels all in each row displaying the color in mid gray scale level during pre-charging are essentially identical. Thus, the problem that the color of the Ichimatsu pattern tends to a certain color is addressed.

In order to make the characteristics and effects of the present invention more obvious and comprehensible, the present invention is described in further detail below with reference to embodiments and the accompanying drawings.

BRIEF DESCRIPTION OF THE DRAWINGS

The present invention will become more fully understood from the detailed description given herein below for illustration only, and thus are not limitative of the present invention, and wherein.

DETAILED DESCRIPTION OF THE INVENTION

Figure 1A:
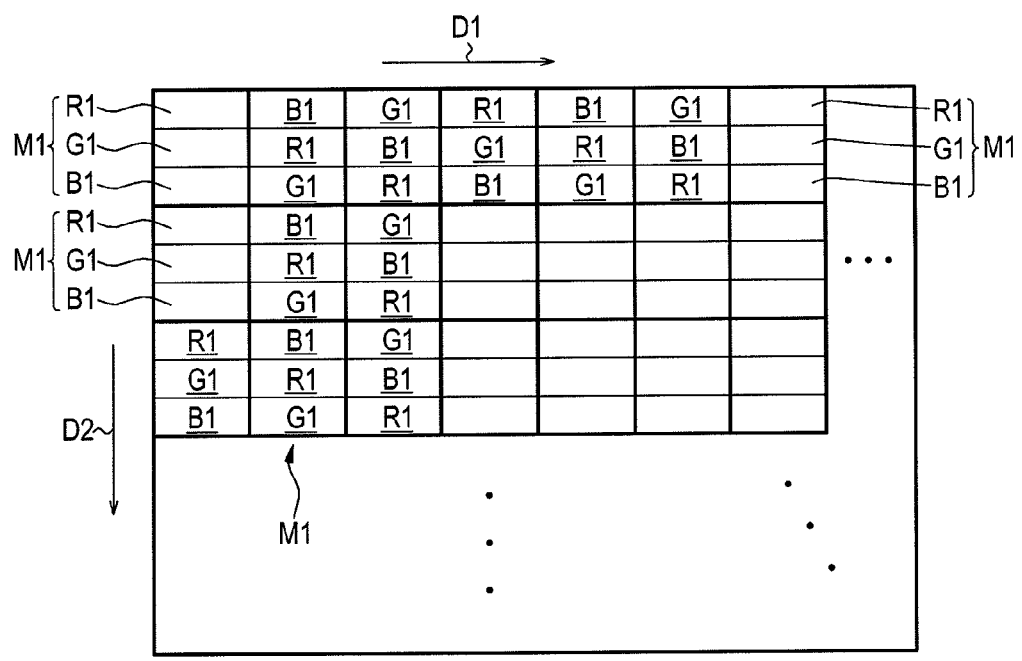
FIG. 1A is a top schematic view of a triple-gate LCD panel according to the first embodiment of the present invention.

FIG. 1A is a top schematic view of a triple-gate LCD panel according to the first embodiment of the present invention. Firstly referring to FIG. 1A, a triple-gate LCD panel 100 of this embodiment includes a plurality of first monochromatic pixels R1, a plurality of second monochromatic pixels B1, and a plurality of third monochromatic pixels G1. Colors of the first monochromatic pixels R1, the second monochromatic pixels B1, and the third monochromatic pixels G1 are different from each other. For example, the first monochromatic pixels R1 are red pixels, the second monochromatic pixels B1 are blue pixels, and the third monochromatic pixels G1 are green pixels.

The first monochromatic pixels R1, the second monochromatic pixels B1, and the third monochromatic pixels G1 are arranged in columns and rows (which is equal to arrangement in a matrix). In particular, the first monochromatic pixels R1, the second monochromatic pixels B1, and the third monochromatic pixels G1 are horizontally arranged in a horizontal direction D1 and are also vertically arranged in a vertical direction D2. Thus, all of the first monochromatic pixels R1, the second monochromatic pixels B1, and the third monochromatic pixels G1 are arranged in a plurality of rows in the horizontal direction D1 and are arranged in a plurality of columns in the vertical direction D2, as shown in FIG. 1A.

The first monochromatic pixels R1 in each row are not adjacent to each other, the second monochromatic pixels B1 in each row are not adjacent to each other, and the third monochromatic pixels G1 in each row are not adjacent to each other. The first monochromatic pixels R1 in each column are not adjacent to each other, the second monochromatic pixels B1 in each column are not adjacent to each other, and the third monochromatic pixels G1 in each column are not adjacent to each other. Therefore, a plurality of monochromatic pixels (that is, the first monochromatic pixels R1, the second monochromatic pixels B1, and the third monochromatic pixels G1) in any one of the columns or in any one of the rows have three different colors.

In addition, the first monochromatic pixels R1, the second monochromatic pixels B1, and the third monochromatic pixels G1 in each row are repeatedly arranged in a horizontal sequence, and the first monochromatic pixels R1, the second monochromatic pixels B1, and the third monochromatic pixels G1 in each column are repeatedly arranged in a vertical sequence. The horizontal sequence from left to right is the first monochromatic pixel R1, the second monochromatic pixel B1, and the third monochromatic pixel G1, and the vertical sequence from top to bottom is the first monochromatic pixel R1, the third monochromatic pixel G1, and the second monochromatic pixel B1.

All of the first monochromatic pixels R1, the second monochromatic pixels B1, and the third monochromatic pixels G1 are sub-pixels. A first monochromatic pixel R1, a second monochromatic pixel B1, and a third monochromatic pixel G1 which are adjacent to each other in any one of the columns may form a main pixel M1, as shown in FIG. 1A. In other words, three adjacent monochromatic pixels (that is, the first monochromatic pixel R1, the second monochromatic pixel B1, and the third monochromatic pixel G1) arranged vertically may form a main pixel M1.

Figure 1B:
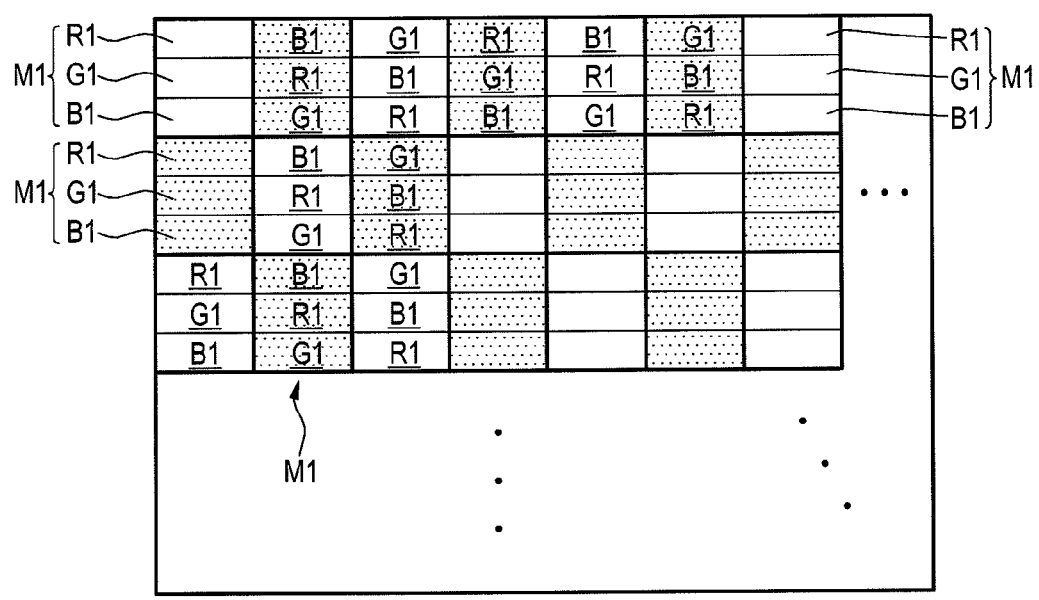
FIG. 1B is a top schematic view of the triple-gate LCD panel in FIG. 1A when displaying an Ichimatsu pattern.

FIG. 1B is a top schematic view of the triple-gate LCD panel in FIG. 1A when displaying an Ichimatsu pattern. Referring to FIG. 1B, when the triple-gate LCD panel 100 displays the Ichimatsu pattern, the first monochromatic pixels R1, the second monochromatic pixels B1, and the third monochromatic pixels G1 in half or almost half of the main pixels M1 display a color in mid gray scale level, and the first monochromatic pixels R1, the second monochromatic pixels B1, and the third monochromatic pixels G1 in the rest of the main pixels M1 display a color in low gray scale level, such as black.

In view of the foregoing, taking 8-bit, 256 gray level values as an example, when the triple-gate LCD panel 100 displays the Ichimatsu pattern, all the gray level values of the colors in mid gray scale level displayed by some of the first monochromatic pixels R1, the second monochromatic pixels B1, and the third monochromatic pixels G1 are 128; and all the gray level values of the colors in low gray scale level displayed by the rest of the first monochromatic pixels R1, the second monochromatic pixels B1, and the third monochromatic pixels G1 are 0.

In order to clearly show the gray level colors displayed by the first monochromatic pixels R1, the second monochromatic pixels B1, and the third monochromatic pixels G1 when the Ichimatsu pattern is displayed, some of the first monochromatic pixels R1, the second monochromatic pixels B1, and the third monochromatic pixels G1 in FIG. 1B are filled with dots. The first monochromatic pixels R1, the second monochromatic pixels B1, and the third monochromatic pixels G1 filled with the dots represent that the first monochromatic pixels R1, the second monochromatic pixels B1, and the third monochromatic pixels G1 display the color in low gray scale level. The first monochromatic pixels R1, the second monochromatic pixels B1, and the third monochromatic pixels G1 without filled with the dots represent that the first monochromatic pixels R1, the second monochromatic pixels B1, and the third monochromatic pixels G1 display the color in mid gray scale level.

As seen from FIG. 1B, when the triple-gate LCD panel 100 displays the Ichimatsu pattern, the main pixels M1 in any column and the main pixels M1 in any one of the rows display the color in mid gray scale level and the color in low gray scale level alternately. Accordingly, the first monochromatic pixels R1, the second monochromatic pixels B1, and the third monochromatic pixels G1 in any one of the rows also display the color in mid gray scale level and the color in low gray scale level alternately. Therefore, all of the main pixels M1 display the color in low gray scale level and the color in mid gray scale level in an arrangement as the pattern of a chess board.

It is the same as the prior art that the triple-gate LCD panel 100 is also driven in a manner of pre-charge and dot inversion, so that the first monochromatic pixels R1, the second monochromatic pixels B1, and the third monochromatic pixels G1 in one row are connected to a scan line (not shown), and in two adjacent monochromatic pixels (that is, two of the first monochromatic pixel R1, the second monochromatic pixel B1, and the third monochromatic pixel G1) in one column, one of the monochromatic pixels is connected to a data line (not shown), and the other monochromatic pixel is connected to another data line. Thus, the monochromatic pixels arranged in each column are connected to two data lines alternately.

Therefore, taking FIG. 1B as an example, during the display of the Ichimatsu pattern, a monochromatic pixel (that is, the first monochromatic pixel R1, the second monochromatic pixel B1, or the third monochromatic pixel G1) at the lower right is simultaneously pre-charged when the first monochromatic pixel R1, the second monochromatic pixel B1, and the third monochromatic pixel G1 of the first row is turned on.

In particular, when the second monochromatic pixel B1 located in the second column from the left and in the first row is turned on, the second monochromatic pixel B1 at the lower right (located in the third column from the left and in the second row) is simultaneously pre-charged; when the first monochromatic pixel R1 located in the fourth column from the left and in the first row is turned on, the first monochromatic pixel R1 at the lower right (located in the fifth column from the left and in the second row) is simultaneously pre-charged; and when the third monochromatic pixel G1 located in the sixth column from the left and in the first row is turned on, the third monochromatic pixel G1 at the lower right (located in the seventh column from the left and in the second row) is simultaneously pre-charged.

Similarly, when the first monochromatic pixels R1, the second monochromatic pixels B1, and the third monochromatic pixels G1 in the second row are turned on, the monochromatic pixel (that is, a first monochromatic pixel R1, a second monochromatic pixel B1, or a third monochromatic pixel G1) at the lower left of the first monochromatic pixels R1, the second monochromatic pixels B1, or the third monochromatic pixels G1 in the second row will be simultaneously pre-charged.

In particular, when the first monochromatic pixel R1 located in the second column from the left and in the second row is turned on, the second monochromatic pixel B1 at the lower left (located in the first column from the left and in the third row) is simultaneously pre-charged; when the third monochromatic pixel G1 located in the fourth column from the left and in the second row is turned on, the first monochromatic pixel R1 at the lower left (located in the third column from the left and in the third row) is simultaneously pre-charged; and when the second monochromatic pixel B1 located in the sixth column from the left and in the second row is turned on, the third monochromatic pixel G1 at the lower left (located in the fifth column from the left and in the third row) is simultaneously pre-charged.

Accordingly, it is known from FIG. 1B that when the first monochromatic pixels R1, the second monochromatic pixels B1, and the third monochromatic pixels G1 in the first row displaying the color in low gray scale level are turned on, the first monochromatic pixels R1, the second monochromatic pixels B1, and the third monochromatic pixels G1 in the second row displaying the color in mid gray scale level are simultaneously pre-charged respectively. When the first monochromatic pixels R1, the second monochromatic pixels B1, and the third monochromatic pixels G1 in the second row displaying the color in low gray scale level, the second monochromatic pixels B1, the third monochromatic pixels G1, and the first monochromatic pixels R1 in the third row displaying the color in mid gray scale level are simultaneously pre-charged respectively.

In view of the foregoing, compared with the prior art, the voltages received by the first monochromatic pixels R1, the second monochromatic pixels B1, and the third monochromatic pixels G1 in each row displaying the color in mid gray scale level during pre-charging are essentially identical when displaying the Ichimatsu pattern. Thus, the color of the Ichimatsu pattern is white or close to white and not easily close to a color except white, such as red, green, or blue. Therefore, the problem that the color of the Ichimatsu pattern is close to a certain color is addressed, thereby preventing the quality of the picture from being affected.

Figure 2:
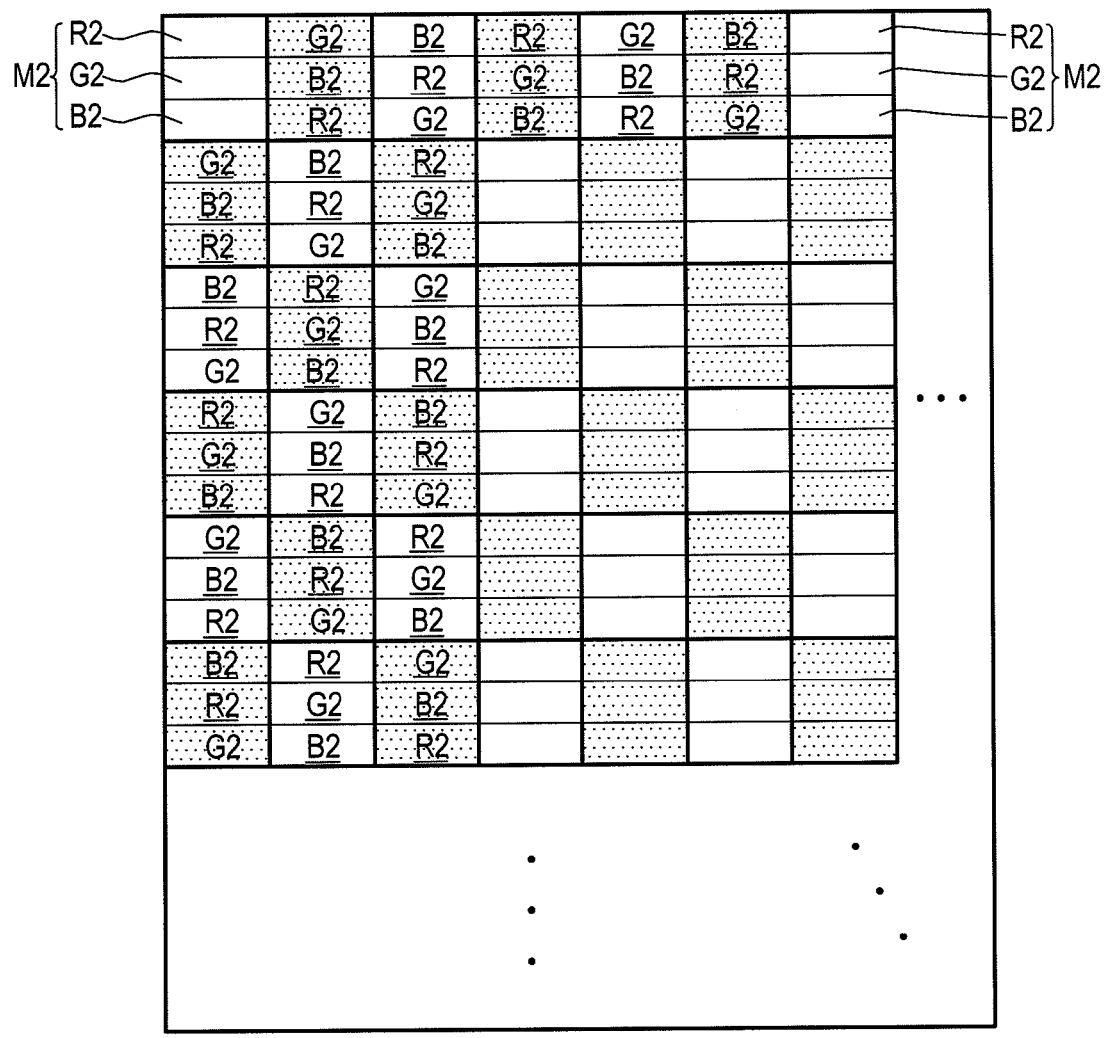
FIG. 2 is a top schematic view of a triple-gate LCD panel according to the second embodiment of the present invention when displaying an Ichimatsu pattern.

FIG. 2 is a top schematic view of a triple-gate LCD panel according to the second embodiment of the present invention when displaying an Ichimatsu pattern. Referring to FIG. 2, a triple-gate LCD panel 200 of the second embodiment is similar to the triple-gate LCD panel 100 of the first embodiment, and the difference between the LCD panels 100 and 200 merely lies in the arrangement of the monochromatic pixels and will be described below.

The triple-gate LCD panel 200 includes a plurality of first monochromatic pixels R2, a plurality of second monochromatic pixels G2, and a plurality of third monochromatic pixels B2. The first monochromatic pixels R2, the second monochromatic pixels G2, and the third monochromatic pixels B2 are arranged in columns and rows. Colors of the first monochromatic pixels R2, the second monochromatic pixels G2, and the third monochromatic pixels B2 are different from each other. For example, the first monochromatic pixels R2 are red pixels, the second monochromatic pixels G2 are green pixels, and the third monochromatic pixels B2 are blue pixels.

In this embodiment, the first monochromatic pixels R2, the second monochromatic pixels G2, and the third monochromatic pixels B2 in each row are repeatedly arranged in a horizontal sequence, and the first monochromatic pixels R2, the second monochromatic pixels G2, and the third monochromatic pixels B2 in each column are repeatedly arranged in a vertical sequence. The horizontal sequence from left to right is the first monochromatic pixel R2, the second monochromatic pixel G2, and the third monochromatic pixel B2.

The vertical sequence from top to bottom is the first monochromatic pixel R2, the second monochromatic pixel G2, the third monochromatic pixel B2, the second monochromatic pixel G2, the third monochromatic pixel B2, the first monochromatic pixel R2, the third monochromatic pixel B2, the first monochromatic pixel R2, and the second monochromatic pixel G2.

In addition, all of the first monochromatic pixels R2, the second monochromatic pixels G2, and the third monochromatic pixels B2 are sub-pixels. A first monochromatic pixel R2, a second monochromatic pixel G2, and a third monochromatic pixel B2 which are adjacent to each other in any one of the columns may form a main pixel M2.

When an Ichimatsu pattern is displayed, the first monochromatic pixels R2, the second monochromatic pixels G2, and the third monochromatic pixels B2 in half or almost half of the main pixels M2 display a color in mid gray scale level (the gray level value is, for example, 128), and the first monochromatic pixels R2, the second monochromatic pixels G2, and the third monochromatic pixels B2 in the rest of the main pixels M2 display a color in low gray scale level (the gray level value is, for example, 0).

In order to clearly show the gray level colors displayed by the first monochromatic pixels R2, the second monochromatic pixels G2, and the third monochromatic pixels B2 when the Ichimatsu pattern is displayed, some of the first monochromatic pixels R2, the second monochromatic pixels G2, and the third monochromatic pixels B2 in FIG. 2 are filled with dots to represent the display of the colors in mid gray scale level and in low gray scale level.

In particular, the first monochromatic pixels R2, the second monochromatic pixels G2, and the third monochromatic pixels B2 filled with the dots represent the color in low gray scale level. The first monochromatic pixels R2, the second monochromatic pixels G2, and the third monochromatic pixels B2 without filled with the dots represent the color in mid gray scale level. As seen from FIG. 2, when the Ichimatsu pattern is displayed, all of the main pixels M2 display the colors in low gray scale level and in mid gray scale level in an arrangement as the pattern of a chess board.

It is the same as the prior art that the triple-gate LCD panel 200 is also driven in a manner of pre-charge and dot inversion. Thus, taking FIG. 2 as an example, during the display of the Ichimatsu pattern, when the first monochromatic pixels R2, the second monochromatic pixels G2, and the third monochromatic pixels B2 in the first row are turned on, the monochromatic pixel at the lower right (that is, a first monochromatic pixel R2, a second monochromatic pixel G2, or a third monochromatic pixel B2) of the first monochromatic pixels R2, the second monochromatic pixels G2, or the third monochromatic pixels B2 in the first row will be simultaneously pre-charged.

In particular, when the second monochromatic pixel G2 located in the second column from the left and in the first row is turned on, the first monochromatic pixel R2 at the lower right (located in the third column from the left and in the second row) is simultaneously pre-charged; when the first monochromatic pixel R2 located in the fourth column from the left and in the first row is turned on, the third monochromatic pixel B2 at the lower right (located in the fifth column from the left and in the second row) is simultaneously pre-charged; and when the third monochromatic pixel B2 located in the sixth column from the left and in the first row is turned on, the second monochromatic pixel G2 at the lower right (located in the seventh column from the left and in the second row) is simultaneously pre-charged.

Similarly, when the first monochromatic pixels R2, the second monochromatic pixels G2, and the third monochromatic pixels B2 in the second row are turned on, the monochromatic pixel at the lower left (that is, a first monochromatic pixel R2, a second monochromatic pixel G2, or a third monochromatic pixel B2) of the first monochromatic pixels R2, the second monochromatic pixels G2, or the third monochromatic pixels B2 in the second row will be simultaneously pre-charged.

In particular, when the third monochromatic pixel B2 located in the second column from the left and in the second row is turned on, the third monochromatic pixel B2 at the lower left (located in the first column from the left and in the third row) is simultaneously pre-charged; when the second monochromatic pixel G2 located in the fourth column from the left and in the second row is turned on, the second monochromatic pixel G2 at the lower left (located in the third column from the left and in the third row) is simultaneously pre-charged; and when the first monochromatic pixel R2 located in the sixth column from the left and in the second row is turned on, the first monochromatic pixel R2 at the lower left (located in the fifth column from the left and in the third row) is simultaneously pre-charged.

Accordingly, it is known from FIG. 2 that when the first monochromatic pixels R2, the second monochromatic pixels G2, and the third monochromatic pixels B2 in the first row displaying the color in low gray scale level are turned on, the third monochromatic pixels B2, the first monochromatic pixels R2, and the second monochromatic pixels G2 in the second row displaying the color in mid gray scale level are simultaneously pre-charged respectively; and when the first monochromatic pixels R2, the second monochromatic pixels G2, and the third monochromatic pixels B2 in the second row displaying the color in low gray scale level are turned on, the first monochromatic pixels R2, the second monochromatic pixels G2, and the third monochromatic pixels B2 in the third row displaying the color in mid gray scale level are simultaneously pre-charged respectively.

In view of the foregoing, compared with the prior art, when the Ichimatsu pattern is displayed, the voltages received by the first monochromatic pixels R2, the second monochromatic pixels G2, and the third monochromatic pixels B2 in each row displaying the color in mid gray scale level during pre-charging are essentially identical, thereby enabling the color of the Ichimatsu pattern to be white or close to white and not to be close to a color except white, such as red, green, or blue. Therefore, the problem that the color of the Ichimatsu pattern is close to a certain color is addressed, thereby preventing the quality of the picture from being affected.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A triple-gate liquid crystal display (LCD) panel, comprising:
   a plurality of first monochromatic pixels;
   a plurality of second monochromatic pixels; and
   a plurality of third monochromatic pixels, wherein the first monochromatic pixels, the second monochromatic pixels, and the third monochromatic pixels are arranged in columns and rows, the first monochromatic pixels, the second monochromatic pixels, and the third monochromatic pixels in each of the rows are repeatedly arranged in a horizontal sequence, the horizontal sequence from left to right is the first monochromatic pixel, the second monochromatic pixel, and the third monochromatic pixel, the first monochromatic pixels in each of the columns are not adjacent to each other, the second monochromatic pixels in each of the columns are not adjacent to each other, and the third monochromatic pixels in each of the columns are not adjacent to each other;
   wherein the first monochromatic pixel is a red pixel, the second monochromatic pixel is a blue pixel, and the third monochromatic pixel is a green pixel.

2. The triple-gate LCD according to claim 1, wherein the first monochromatic pixels, the second monochromatic pixels, and the third monochromatic pixels in each of the columns are repeatedly arranged in a vertical sequence, and the vertical sequence from top to bottom is the first monochromatic pixel, the third monochromatic pixel, and the second monochromatic pixel.

3. The triple-gate LCD panel according to claim 1, wherein the first monochromatic pixels, the second monochromatic pixels, and the third monochromatic pixels in each of the columns are repeatedly arranged in a vertical sequence, and the vertical sequence from top to bottom is the first monochromatic pixel, the second monochromatic pixel, the third monochromatic pixel, the second monochromatic pixel, the third monochromatic pixel, the first monochromatic pixel, the third monochromatic pixel, the first monochromatic pixel, and the second monochromatic pixel.

4. A triple-gate liquid crystal display (LCD) panel, comprising:
   a plurality of first monochromatic pixels;
   a plurality of second monochromatic pixels; and
   a plurality of third monochromatic pixels, wherein the first monochromatic pixels, the second monochromatic pixels, and the third monochromatic pixels are arranged in columns and rows, the first monochromatic pixels, the second monochromatic pixels, and the third monochromatic pixels in each of the rows are repeatedly arranged in a horizontal sequence, the horizontal sequence from left to right is the first monochromatic pixel, the second monochromatic pixel, and the third monochromatic pixel, the first monochromatic pixels in each of the columns are not adjacent to each other, the second monochromatic pixels in each of the columns are not adjacent to each other, and the third monochromatic pixels in each of the columns are not adjacent to each other;
   wherein the first monochromatic pixels, the second monochromatic pixels, and the third monochromatic pixels in each of the columns are repeatedly arranged in a vertical sequence, and the vertical sequence from top to bottom is the first monochromatic pixel, the third monochromatic pixel, and the second monochromatic pixel.

5. A triple-gate liquid crystal display (LCD) panel, comprising:
   a plurality of first monochromatic pixels;
   a plurality of second monochromatic pixels; and
   a plurality of third monochromatic pixels, wherein the first monochromatic pixels, the second monochromatic pixels, and the third monochromatic pixels are arranged in columns and rows, the first monochromatic pixels, the second monochromatic pixels, and the third monochromatic pixels in each of the rows are repeatedly arranged in a horizontal sequence, the horizontal sequence from left to right is the first monochromatic pixel, the second monochromatic pixel, and the third monochromatic pixel, the first monochromatic pixels in each of the columns are not adjacent to each other, the second monochromatic pixels in each of the columns are not adjacent to each other, and the third monochromatic pixels in each of the columns are not adjacent to each other;
   wherein the first monochromatic pixels, the second monochromatic pixels, and the third monochromatic pixels in each of the columns are repeatedly arranged in a vertical sequence, and the vertical sequence from top to bottom is the first monochromatic pixel, the second monochromatic pixel, the third monochromatic pixel, the second monochromatic pixel, the third monochromatic pixel, the first monochromatic pixel, the third monochromatic pixel, the first monochromatic pixel, and the second monochromatic pixel.

* * * * *